United States Patent [19]

Tsujimura et al.

[11] Patent Number: 4,679,968
[45] Date of Patent: Jul. 14, 1987

[54] INDEXABLE CUTTER INSERT

[75] Inventors: Osamu Tsujimura, Kawasaki; Ryoei Hasegawa, Ota; Masayuki Ohkawa, Kawasaki, all of Japan

[73] Assignee: Mitsubishi Kinzoku Kabushiki Kaisha, Tokyo, Japan

[21] Appl. No.: 878,774

[22] Filed: Jun. 25, 1986

[30] Foreign Application Priority Data

Jun. 28, 1985 [JP] Japan ............................. 60-98985[U]
May 16, 1986 [JP] Japan ............................. 61-73506[U]

[51] Int. Cl.$^4$ ........................ B23B 27/16; B23C 5/20
[52] U.S. Cl. .................................... 407/114; 407/42; 407/113; 408/228; 408/713
[58] Field of Search ........................ 407/36, 40, 42, 53, 407/54, 113, 114, 115, 116; 408/228, 713

[56] References Cited

U.S. PATENT DOCUMENTS

| | | | |
|---|---|---|---|
| 4,512,689 | 4/1985 | Bylund | 407/113 |
| 4,529,339 | 7/1985 | Shimomura et al. | 407/114 |
| 4,588,331 | 5/1986 | Yoshinori | 407/113 |

FOREIGN PATENT DOCUMENTS

| | | | |
|---|---|---|---|
| 91408 | 10/1983 | European Pat. Off. | 407/114 |
| 124381 | 9/1979 | Japan | 407/114 |

*Primary Examiner*—M. Jordan
*Assistant Examiner*—Jerry Kearns
*Attorney, Agent, or Firm*—Cushman, Darby & Cushman

[57] ABSTRACT

A cutter insert of the indexable type for a rotary cutter includes a body of a plate of a generally circular shape and having three notches of a V-shape formed in a circumferential face of the body in equally circumferentially spaced relation, each V-shaped notch being defined by a pair of first and second opposed walls. A front face of the body cooperates with the circumferential face, interrupted by the three V-shaped notches, to define three arcuate convex cutting edges each having a leading and a trialing end. A marginal portion of the front face disposed adjacent to and extending along each cutting edge serves as a rake surface for the cutting edge, the rake surface being recessed adjacent to the first wall of the V-shaped notch so as to slope toward a rear face of the body toward the first wall to provide a convex portion extending between the front face and the first wall. The first wall of each V-shaped notch, intersecting a respective one of the cutting edges at the leading edge thereof, is sloping toward the trailing end of the adjacent cutting edge at the second wall of the notch and is inclined with respect to a plane disposed perpendicular to the front face and passing through a center of a circle along which the one cutting edge extends and the leading end of the one cutting edge disposed at the first wall.

6 Claims, 20 Drawing Figures

INDEXABLE CUTTER INSERT

BACKGROUND OF THE INVENTION

1. Field of the Invention

This invention relates to indexable cutter inserts for a rotary cutter such as a ball end mill.

2. Prior Art

In recent years, rotary cutters of the type having one or more cutter inserts of cemented carbide releasably attached to a cutter body have been extensively used. FIGS. 1 and 2 show one such conventional ball end mill 138 as disclosed in Japanese patent application Laid-Open (Kokai) No. 58-181502. A conventional cutter insert 110 of the indexable type employed in this ball end mill comprises a plate-like body 111 of a generally circular shape defined by a front face 112, a rear face 114 and a circumferential face 116. Three notches 120 are formed in the circumferential face 116 of the insert body 111 in circumferentially equally-spaced relation to one another to provide three circumferentially equally-spaced side faces 118 interrupted by the notches 120. Each of the notches 120 has a generally trapezoidal shape when viewed in a direction perpendicular to the front face 112 of the insert body 111, and is defined by a pair of first and second opposed walls 120a and 120b converging radially inwardly and a bottom wall 120c interconnecting the first and second walls 120a and 120b at their inner ends. The front face 112 of the insert body 111 cooperates with the three side faces 118 to define three cutting edges 122 of an equal length, so that each cutting edge 122 extends between the first wall 120a of one of each two adjacent notches 120 and the second wall 120b of the other. And, the cutting edge 122 has a leading end 122a where it intersects the first wall 120a of the one notch 120 and also has a trailing end 122b where it intersects the second wall 120b of the other notch 120. A substantially equilateral triangle is defined by three straight lines each extending between each adjacent ones of the leading ends 122a of the three cutting edges 122. The first wall 120a of each notch 120 is disposed in a plane 130 perpendicular to the front face 114 of the insert body 111 and passing through the leading end 122a of the cutting edge 122 and a center 131 of a circle along which the arcuate cutting edge 122 extends when viewed in a direction perpendicular to the front face 114.

A marginal portion 124 of the front face 112 disposed adjacent to and extending along each cutting edge 122 serves as a rake surface. The rake surface 124 is recessed adjacent to the first wall 120a of the trapezoidal notch 122 to provide a convexly curved surface 128. The rake surface 124 is also sloping toward the rear face 114 toward the trailing end 122b of the cutting edge 122. A straight second cutting edge 132 which extends from the trailing end 122b of each arcuate cutting edge 122 is also defined by the front face 112 and an outer portion of the second wall 120b of the trapezoidal notch 120. An angle γ between the second cutting edge 132 and a line tangent to the arcuate cutting edge 132 at the trailing end 122b is obtuse (FIG. 8). An inner portion of the second wall 120b serves as a detent wall as later described.

As shown in FIGS. 1 and 2, the cutter insert 110 is removably secured by a clamp screw 139 to an insert pocket 140 of a body 138a of the ball end mill 138, with the rear face 114 mated with a seat surface 140a of the insert pocket 140, in such a manner that an indexed one of the three cutting edges 122 is so disposed as to extend outwardly beyond the front end and outer periphery of the end mill body 138a, the body 138a being adapted for rotation about an axis 0 thereof. A lock projection 142 on the insert pocket 140 is received in the trapezoidal notch 120 disposed between the cutting edges 122 other than the indexed cutting edge 122 with the inner detent portion of the second wall 120b - held against the lock projection 142, thereby preventing the insert body 111 against angular movement about the clamp screw 139. As shown in FIG. 1, the axial rake angle for the indexed cutting edge 122 is positive. The second cutting edge 132 extending from the indexed cutting edge 122 serves to cut a workpiece when it is retracted or moved rearwardly with respect to the workpiece during the cutting operation.

As described above, the first wall 120a of the trapezoidal notch 120 is disposed in the plane 130 passing through the leading end 122a of the cutting edge 122 and the center 131 of the circle along which the arcuate cutting edge 122 extends. And, the rake surface 124 has the convexly arcuate leading end portion 128. As a result, the effective length of the cutting edge 122 is reduced, and therefore a radius of cutting of the rotating end mill 138 is correspondingly reduced. In addition, as shown in FIG. 3, an angle $\theta$ defined by the first wall 120a of the trapezoidal notch 120 and a straight line tangent to the indexed cutting edge 122 at its leading end 122a is 90°, and therefore a corner portion defined by the first wall 120a and the side face 116 is susceptible to damage or chipping.

SUMMARY OF THE INVENTION

It is therefore an object of this invention to provide an indexable cutter insert having three arcuate cutting edges in which an effective length of each arcuate cutting edge is not unduly reduced and in which the cutting edge is less susceptible to damage.

According to the present invention, there is provided a cutter insert of the indexable type for a rotary cutter comprising a body comprising a plate of a generally circular shape defined by a front face, a rear face and a circumferential face lying between said front and rear faces, said body having three notches of a V-shape formed in said circumferential face in circumferentially equally-spaced relation to one another to interrupt said circumferential face to provide three circumferentially equally-spaced side faces, each of said V-shaped notch being defined by a pair of first and second opposed walls converging radially inwardly of said body;

each of said side faces cooperating with said front face to define an arcuate convex cutting edge, so that said cutting edge extends between said first wall of one of each two adjacent V-shaped notches and said second wall of the other, said cutting edge having a leading end where it intersects said first wall of said one notch and also having a trailing end where it intersects said second wall of said other notch, three straight lines each extending between each adjacent ones of said leading ends of said three cutting edges defining a substantially equilateral triangle, each of said arcuate cutting edges assuming a part of a circle having a radius greater than a radius of a circumcircle circumscribing said equilateral triangle;

a marginal portion of said front face disposed adjacent and extending along each cutting edge serving as a rake surface for said cutting edge, said rake surface being recessed adjacent to said first wall of said V-shaped notch so as to slope toward said rear face toward said first wall to provide a convex portion extending between said front face and said first wall;

said first wall of each V-shaped notch sloping toward said trailing end of the adjacent cutting edge at said second wall of said notch and being inclined with respect to a plane disposed perpendicular to said front face and passing through a center of said circle along which said arcuate cutting edge extends and said leading end of said cutting edge disposed at said first wall.

DESCRIPTION OF THE PREFERRED EMBODIMENTS OF THE INVENTION

Figure 1:
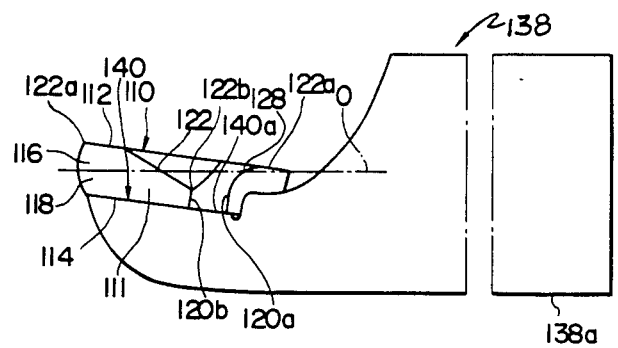
FIG. 1 is a side-elevational view of a portion of an end mill employing a cutter insert provided in accordance with the prior art.
Figure 2:
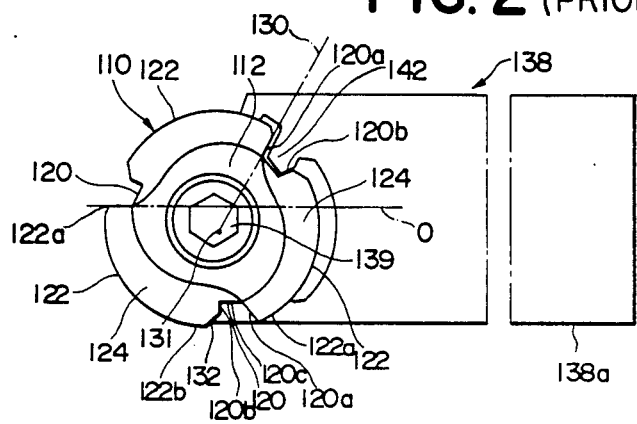
FIG. 2 is a front elevational view of the end mill.

FIGS. 10 to 19 shows an indexable cutter insert 10 which comprises a body 11 comprising a plate of a generally circular shape defined by a front flat face 12, a rear flat face 14 disposed parallel to the front face 12 and a circumferential face 16 lying between the front and rear faces 12 and 14, the insert body 11 being made of cemented carbide. The circumferential face 16 is tapering from the front face 12 toward the rear face 14. The insert body 11 has three V-shaped notches 20 formed in the circumferential face 16 in circumferentially equally-spaced relation to one another to interrupt the circumferential face 16 to provide three circumferentially equally-spaced side faces 18. Each of the V-shaped notches 20 extends from the front face 12 to the rear face 14 and is defined by a pair of flat opposed first and second walls 20a and 20b disposed perpendicular to the front face 12 and converging toward each other radially inwardly of the circular insert body 11. The three side faces 18 cooperate with the front face 12 to define three arcuate convex cutting edges 22 of an identical shape and size. Therefore, the three cutting edges 22 of an equal length are spaced from each other equally circumferentially of the circular insert body 11. And, each cutting edge 22 extends between the first wall 20a of one of each two adjacent V-shaped notches 20 and the second wall 20b of the other. The cutting edge 22 has a leading end 22a where it intersects the first wall 20a and also has a trailing end 22b where it intersects the second wall 20b.

A marginal portion 24 of the front face 12 disposed adjacent to and extending along the arcuate cutting edge 22 serves as a rake surface for the cutting edge 22. The marginal portion 24 is recessed as at 26 adjacent to the first wall 20a of each V-shaped notch 20 so as to slope toward the rear face 14 to provide a convex portion 28 which serves as a leading end portion of the rake surface 24 of the arcuate cutting edge 22. The convex portion 28 is defined by a first flat surface 28a extending from the front face at one end and a second flat surface 28b extending from the first flat surface 28a and the first wall 20a of the V-shaped notch 20. The angle between the first surface 28a and the front face 12 is greater than the angle between the second surface 28b and the front face 12. Although not clearly shown in the drawings, the corner portion into which the first surface 28a and the front face 12 merge, the corner portion into which the first and second surfaces 28a and 28b merge, and the corner portion into which the second surface 28b and the first wall 20a of the V-shaped notch 20 merge are all so chamfered as to be convexly curved. And, the recess 26 is defined by the first and second flat surfaces 28a and 28b and a flat surface 28c disposed perpendicular to the front face 12 and extending from the front face 12 to the first and second surfaces 28a and 28b. The flat surface 28c lies flush with and is continuous to the second surface 20b of the V-shaped notch 20.

Figure 10:
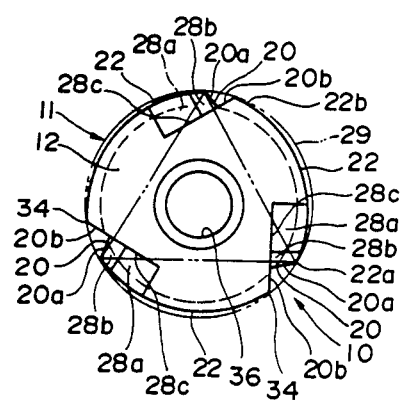
FIG. 10 is a plan view of a cutter insert provided in accordance with the present invention.
Figure 11:
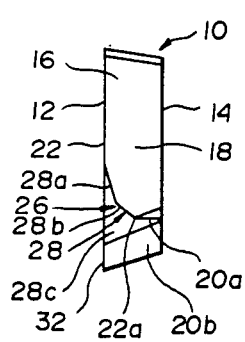
FIG. 11 is a side-elevational view of the insert of FIG. 10.
Figure 12:
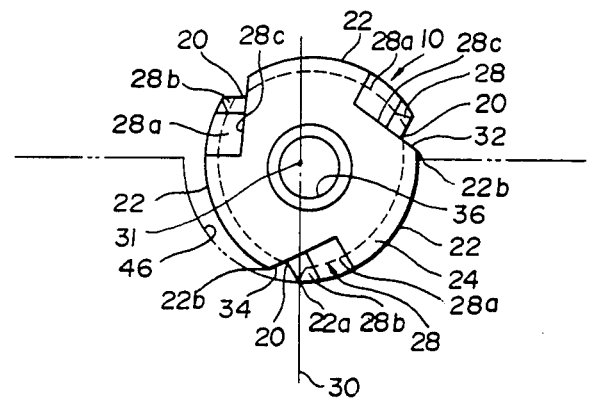
FIGS. 12 to 17 views of the insert of FIG. 1, showing the various features of the construction of the insert.

Each of the three arcuate cutting edges 22 assumes a part of a circle having a radius greater than a radius of a circumcircle 29 circumscribing a substantially equilateral triangle define by three straight lines each extending between each adjacent ones of the leading ends 22a of the cutting edges 22, the equilateral triangle and the circumcircle being indicated in dots-and-dash lines in FIG. 10. The arc defined by the arcuate cutting edge 22 is substantially equal to a quater of the above-mentioned circle along which it extends.

Figure 13:
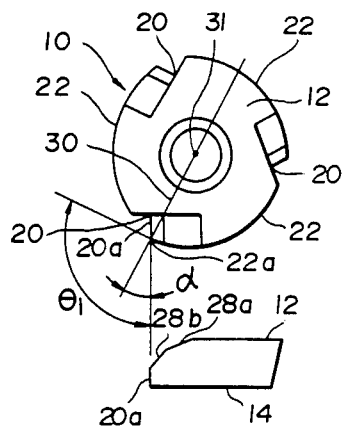

As best shown in FIG. 13, the first wall 20a of the V-shaped notch 20 is sloping toward the trailing end 22b of the adjacent cutting edge 22 at the second wall 20b and is inclinded at an angle α with respect to a plane 30 disposed perpendicular to the front face 12 and passing through the leading end 22a of each arcuate cutting edge 22 and a center 31 of the above-mentioned circle along which the arcuate cutting edge 22 extends. With this arrangement, an angle θ defined by the first wall 20a of the V-shaped notch 20 and a straight line tangent to the arcuate cutting edge 22 at its leading end 22a is more than 90°, that is to say, obtuse.

Figure 16:
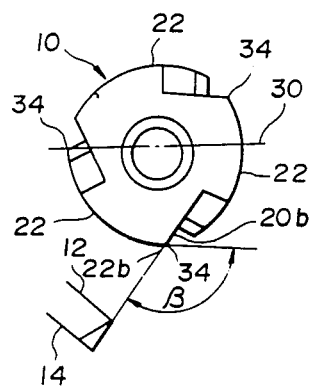
Figure 17:
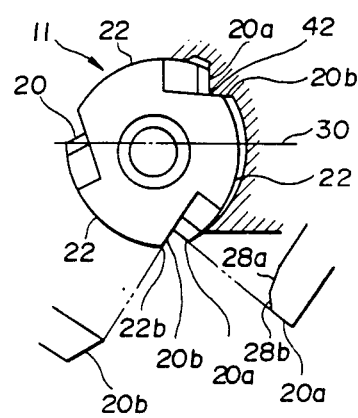

As shown in FIG. 16, an angle β, defined by the second wall 20b of each v-shaped notch 20 and a straight line tangent to the arcuate cutting edge 22 at its trailing end 22b, is more than 90°, that is to say, obtuse. A second straight cutting edge 32 is defined by the front face 12 and the second wall 20b of the V-shaped notch 20. A corner portion or nose 34 into which the side face 18 and the second wall 22b of the V-shaped notch 20 merge is chamfered so as to be convexly curved. The insert body 11 has a central aperture 36 formed therethrough.

Figure 18:
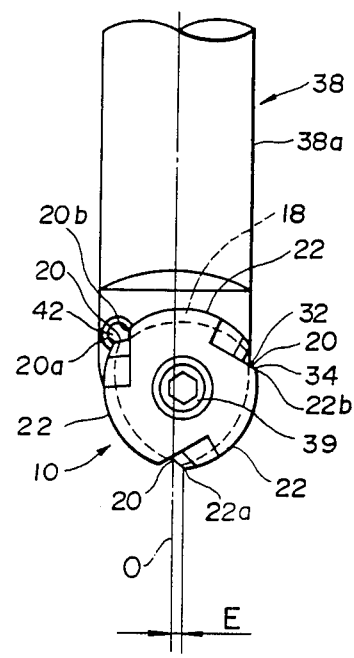
FIG. 18 is a front elevational view of a portion of an end mill employing the insert of FIG. 10.
Figure 19:
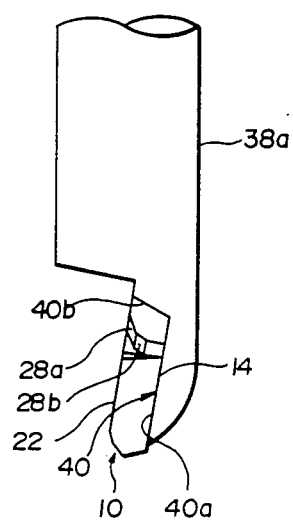
FIG. 19 is a side-elevational view of the end mill of FIG. 18.

As shown in FIGS. 18 and 19, the cutter insert 10 is releasably secured to a body 38a of an ball end mill 38 by a clamp screw 39 passing through the centeral aperture 36 into the body 38a. Formed in a forward end portion of the cutter body 38a is a pocket 40 having a flat seat surface 40a which is slightly inclined with respect to an axis 0 of rotation of the cutter or end mill body 38a when viewed from the side of the insert 11, the end mill body 38a being rotatable about its axis 0. The pocket 40 also has an arcuate concave abutment surface 40b. The flat rear face 14 and one of the three side faces 18 are mated with the seat surface 40a and the abutment surface 40b, respectively. In this condition, one of the cutting edges 22 is disposed in an indexed position, and the indexed cutting edge 22, shown in FIG. 18 at the right-hand side of the axis 0 of rotation of the cutter body 38a, extends outwardly slightly beyond the forward end portion of the cutter body 38a. The other two cutting edges 22 adjacent to the indexed cutting edge 22 are so disposed as not to interfere with a workpiece when the cutting operation is effected by the end mill 38. The indexed cutting edge 22 has a positive axial rake angle. The cutter body 38a has a lock projection 42 formed on the forward end portion thereof and having a V-shaped portion projecting into the pocket 40. One of the V-shpaed notches 20 provided between those two cutting edges 22 other than the indexed cutting edges 22 is fitted on the V-shaped portion of the lock projection 42 with the pair of first and second walls 20a and 20b held against the V-shaped shaped portion, so that the insert body 11 is positively prevented from being angularly moved relative to the cutter body 38a about the clamp screw 39.

As shown in FIG. 18, the leading end 22a of the indexed cutting edge 22 is slightly spaced from the axis 0 of the cutter body 38a a distance E of not more than 0.3 mm in a right-hand direction. The leading end 22a may be disposed on the axis 0.

The difference in operation between the insert 10 and the conventional insert 100 will now be described with reference to FIGS. 3 to 9 and FIGS. 13 to 17.

Figure 3:
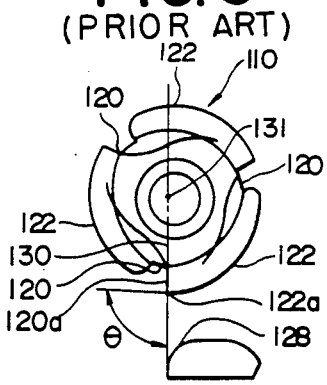
FIGS. 3 to 5 are views of the cutter insert, showing its construction.

(i) As shown in FIG. 3, with respect to the conventional insert 110, the first wall 120a of each trapezoidal notch 120 is disposed in the plane 130 perpendicular to the front face 114 of the insert body 111 and passing through the leading end 122a of the arcuate cutting edge 122 and the center 131 of the circle along which the arcuate cutting edge 122 extends. Therefore, the angle $\theta$ defined by the first wall 120a of the notch 120 and the straight line tangent to the cutting edge 22 at its leading end 122a is 90°. And, the arcuate cutting edge 122 is susceptible to damage or chipping at its leading end 122a. On the other hand, with respect to the insert 10 according to the present invention, as shown in FIG. 13, the first wall 20a of the V-shaped notch 20 is sloping toward the trailing end 22b of the adjacent cutting edge 22 and is inclined at an angle $\alpha$ with respect to the plane 30 disposed perpendicular to the front face 12 and passing through the leading end 22a of each arcuate cutting edge and the center 31 of the circle along which the arcuate cutting edge 22 extends. Therefore, the angle $\theta 1$ defined by the first wall 20a of the V-shaped notch 20 and the straight line tangent to the arcuate cutting edge 22 at its leading end 22a is more than 90°. Therefore, the cutting edge 22 has an increased strength at its leading end 22a, and the leading edge 22a of the arcuate cutting edge 22 is less liable to damage or chipping. In addition, as a result of the inclination of the first wall 20a with respect to the plane 30, the notch 20 can be reduced in size, so that the effective length of the arcuate cutting edge 22 can be increased without increasing the overall size of the insert 10. As a result, a radius of cutting of the rotating end mill 38 is correspondingly increased.

Figure 4:
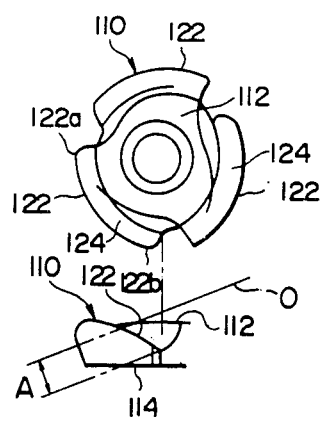
Figure 5:
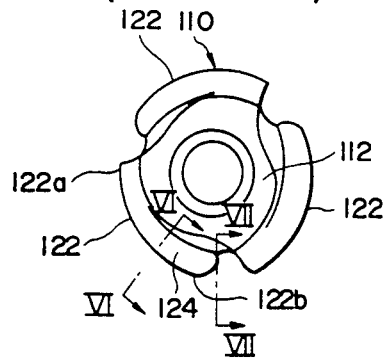
Figure 6:
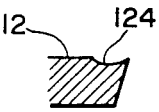
FIG. 6 is a fragmentary cross-sectional view taken along the line VI—VI of FIG. 5.
Figure 7:
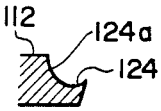
FIG. 7 is a fragmentary cross-sectional view taken along the line VII—VII of FIG. 5.
Figure 14:
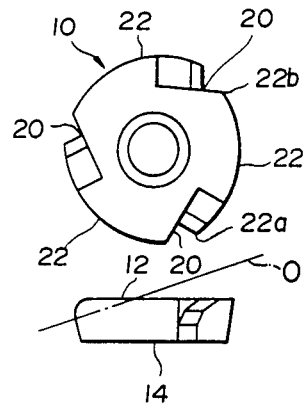

(ii) As shown in FIG. 4, with respect to the conventional insert 110, the rake surface 124 which extends along the arcuate cutting edge 122 is sloping toward the rear face 114 toward the trailing end 122b. Therefore, in the case where the insert 110 is attached to the cutter body 138a of the ball end mill 138 in such a manner that the indexed arcuate cutting edge 122 has a positive axial rake angle, the spacing of the indexed cutting edge 122 from the axis 0 of the cutter body 138a increases progressively from its leading end 122a toward its trailing end 122b, as indicated by character A in FIG. 4. In addition, since the thickness of the conventional insert body 111 between the front and rear faces 112 and 114 is substantially reduced at the trailing end 122b of the cutting edge 122, the cutting edge 122 has a reduced strength at its trailing end 122b. On the other hand, with respect to the insert 10 according to the present invention, as shown in FIG. 14, the rake surface 24 for each arcuate cutting edge 22 is constititued by the front face 12 and hence is parallel to the rear face 14 except for its leading end portion. Therefore, even in the case where the insert 10 is attached to the cutter body 38a in such a manner that the indexed cutting edge 22 has a positive axial rake angle as shown in the illustrated embodiment, the spacing of the cutting edge 22 from the axis 0 of the cutter body 38a will not increase from the leading to trailing ends so much as that of the cutting edge of the conventional insert 110. Therefore, the insert 10 can machine or process a workpiece with a higher accuracy. In addition, since the thickness of the insert body 11 along the cutting edge 22 is uniform except for the leading portion 28, the cutting edge 22 has a higher strength than the cutting edge 122 of the conventional insert 111.

Figure 15:
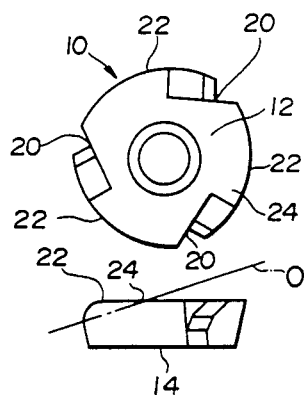

(iii) With respect to the conventional insert 110, the rake surface 124 has a curved concave contour intermediate the leading and trailing ends 122a and 122b of the cutting edge 122 (FIG. 6) when viewed along the length of the rake surface 124, and also has a curved concave contour (FIG. 7) when viewed from the trailing end 122b of the cutting edge 122. More specifically, the concave curved portion of the rake surface 124 at the trailing end 122b of the cutting edge 122 has a curved side wall 124a extending to the front face 12. The curved side wall 124a prevents a smooth discharge of chips during the cutting operation and causes vibration and chattering. On the other hand, with respect to the insert 10 according to the present invention, the rake surface 24 is flat except for its leading portion 28 as shown in FIG. 15. Therefore, the rake surface 24 will not prevent a smooth discharge of chips and curl each chip smoothly. Thus, the insert 10 has a better chip-disposal ability in comparison with the conventional insert 110.

Figure 8:
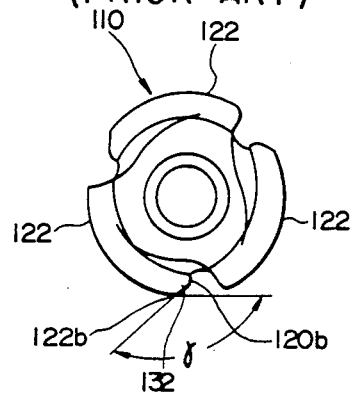
FIGS. 8 and 9 are views of the cutter insert, showing the features of its construction.
Figure 9:
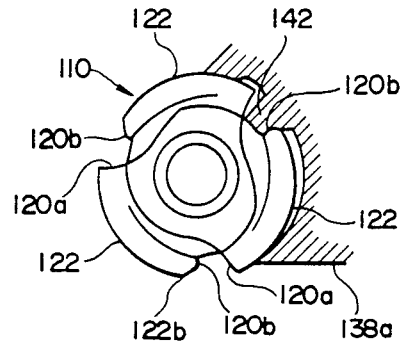

(iv) As shown in FIG. 8, the angle $\gamma$ between the straight second cutting edge 132 and the line tangent to the arcuate cutting edge 122 at the trailing end 122b is obtuse. In addition, the cutting edge 122 is sloping toward the rear face 114 toward its trailing end 122b as shown in FIG. 1. Therefore, if the insert body 111 is attached to the cutter body 138a in such a manner that the indexed cutting edge 122 has a negative axial rake angle, an effective relief angle for the second cutting edge 132 is not sufficient, so that the relief surface of the second cutting edge 132, defined by the second wall 120b of the trapezoidal notch 120, interferes with the workpiece when the end mill 138 is moved rearwardly with respect to the workpiece during the cutting operation, thereby preventing the cutting operation. On the other hand, with respect to the insert 10 according to the present invention, as shown in FIG. 9, the second cutting edge 32 is defined by the second wall 20b of the V-shaped notch 20 and the flat front face 12, which means that the rake surface for the second cutting edge 32 is defined by the flat front face 12. And, the angle β between the second cutting edge 32 and the straight line tangent to the arcuate cutting edge 22 at its trailing end 22a is obtuse. And, the convexly curved nose 34 is provided. Therefore, even if the insert 10 is attached to the cutter body 38a in such a manner that the indexed cutting edge 22 has a negative axial rake angle, an effective relief angle for the second cutting edge 32 is sufficient, so that the relief surface of the second cutting edge 32 defined by the second wall 20b will not interfere with the workpiece when the end mill 38 is moved rearwardly, thereby enabling the second cutting edge 32 to cut the workpiece 46. In addition, by virtue of the provision of the convexly curved nose 34, the second cutting edge 32 is less liable to chipping.

(v) As shown in FIG. 9, with respect to the conventional insert 110, the second wall 120b of the trapezoidal notch 122 is held against the lock projection 142, so that the insert body 111 is prevented from angular movement relative to the cutter body 138a about the clamp screw 139. On the other hand, with respect to the insert 10 according to the present invention, the first and second walls 20a and 20b of the V-shaped notch 20 are both held against the lock projection 42 to prevent the angular movement of the insert body 11 about the clamp screw 39. Generally, a cutter insert of this generally-circular shape, attached to an end mill adapted for rotation in a right-hand direction, tends to be angularly moved about the clamp screw 39 in a right-hand direction when the end mill is fed transversely of the axis of the end mill, and tends to be angularly moved in a left-hand direction when the end mill is fed axially. As described above, the insert 10 according to the present invention is positively prevented from being angularly moved in either direction.

(vi) The convex leading portion 28 is defined by the first and second flat surfaces 28a and 28b, and therefore can be machined more easily than a curved surface. Also, the corner portion defined by the first surface 28a and the front face 12, the corner portion defined by the first and second surfaces 28a and 28b, and the corner portion defined by the second surface 28b and the first wall 20a of the V-shaped notch 20 are chamfered, so that these corner portions are less liable to chipping.

By virtute of the provision of the convex leading portion 28, the cutting load increases gradually as the cutting operation proceeds, and therefore a great load will not be exerted on the cutting edge 22 at a time.

Figure 20:
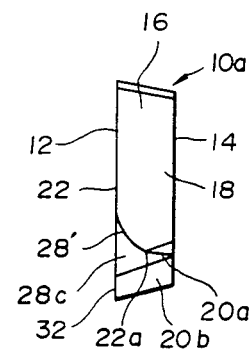
FIG. 20 a view similar to FIG. 11 but showing a modified cutter insert.

FIG. 20 shows a modified insert 10a which differs from the insert 10 shown in FIGS. 10 to 19 only in that a convex leading portion 28' of the rake surface 24 is defined by a curved surface.

While the cutter inserts according to the present invention have been specifically shown and described herein; the invention itself is not to be restricted by the exact showing of the drawings or the description thereof. For example, in the illustrated embodiment, although the insert is attached to the end mill 38 in such a manner that the leading end 22a of the arcuate cutting edge 22 is disposed in the vicinity of the axis 0 of the end mill body 38a, the insert may be used with a radius end mill, in which case the leading end 22a is spaced considerably from an axis of rotation of the end mill body. Also, although the side faces 18 are inclinded at an acute angle with respect to the front face 12 in the illustrated embodiment, the side faces 18 may be disposed perpendicular to the front face 12.

What is claimed is:

1. A cutter insert of the indexable type for a rotary cutter comprising a body comprising a plate of a generally circular shape defined by a front face, a rear face and a circumferential face lying between said front and rear faces, said body having three notches of a V-shape formed in said circumferential face in circumferentially equally-spaced relation to one another to interrupt said circumferential face to provide three circumferentially equally-spaced side faces, each of said V-shaped notch being defined by a pair of first and second opposed walls converging radially inwardly of said body;

each of said side faces cooperating with said front face to define an arcuate convex cutting edge, so that said cutting edge extends between said first wall of one of each two adjacent V-shaped notches and said second wall of the other, said cutting edge having a leading end where it intersects said first wall of said one notch and also having a trailing end where it intersects said second wall of said other notch, three straight lines each extending between each adjacent ones of said leading ends of said three cutting edges defining a substantially equilateral triangle, each of said arcuate cutting edges assuming a part of a circle having a radius greater than a radius of a circumcircle circumscribing said equilateral triangle;

a marginal portion of said front face disposed adjacent and extending along each cutting edge serving as a rake surface for said cutting edge, said rake surface being recessed adjacent to said first wall of said V-shaped notch so as to slope toward said rear face toward said first wall to provide a convex portion extending between said front face and said first wall;

said first wall of each V-shaped notch sloping toward said trailing end of the adjacent cutting edge at said second wall of said notch and being inclined with respect to a plane disposed perpendicular to said front face and passing through a center of said circle along which said arcuate cutting edge extends and said leading end of said cutting edge disposed at said first wall.

2. A cutter insert according to claim 1, in which said front face is flat, so that said rake surface constititued by said marginal portion of said front face is also flat except for said convex portion.

3. A cutter insert according to claim 2, in which said front face and said second wall of said V-shaped notch define a second straight cutting edge extending from said trailing end of said arcuate cutting edge, an angle defined by said second cutting edge and a straight line tangent to said arcuate cutting edge at said trailing end being obtuse.

4. A cutter insert according to claim 3, in which a corner portion defined by said side face and said second wall of said notch is chamfered into a curved surface.

5. A cutter insert according to claim 1, in which said convex portion of said rake surface is defined by a plurality of flat surfaces lying between said front face and said first wall of said V-shaped notch to provide a polygonal surface, a corner portion defined by said flat surface and the one of said flat surfaces adjacent thereto, a corner portion defined by each adjacent flat surfaces, and a corner portion defined by said first wall of said V-shaped notch and the one of said flat surfaces adjacent thereto being chamfered.

6. A cutter insert according to claim 1, in which said convex portion of said rake surface is defined by a curved surface.

* * * * *